US006700119B1

(12) United States Patent
Giles

(10) Patent No.: US 6,700,119 B1
(45) Date of Patent: Mar. 2, 2004

(54) ION SOURCE FOR MASS ANALYZER

(75) Inventor: Roger Giles, Holmfirth (GB)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 09/913,338

(22) PCT Filed: Feb. 2, 2000

(86) PCT No.: PCT/GB00/00301

§ 371 (c)(1), (2), (4) Date: Jan. 2, 2002

(87) PCT Pub. No.: WO00/48228

PCT Pub. Date: Aug. 17, 2000

(30) Foreign Application Priority Data

Feb. 11, 1999 (GB) .............................................. 9903138

(51) Int. Cl.[7] .............................................. A01J 49/00
(52) U.S. Cl. .............................................. 250/288
(58) Field of Search .............................................. 250/288

(56) References Cited

U.S. PATENT DOCUMENTS 5,756,994 A 5/1998 Bajic

FOREIGN PATENT DOCUMENTS

| | | |
|---|---|---|
| EP | 0 989 585 A2 | 3/2000 |
| GB | 2 225 159 A | 5/1990 |
| GB | 2 308 227 A | 6/1997 |
| GB | 2324906 | 11/1998 |
| GB | 2328074 A * | 2/1999 |

* cited by examiner

*Primary Examiner*—John R. Lee
*Assistant Examiner*—Paul M. Gurzo
(74) *Attorney, Agent, or Firm*—Haynes and Boone, LLP.

(57) ABSTRACT

An ion source for a mass spectrometer includes an atmospheric pressure sample ioniser (20), arranged to generate ionised sample droplets for ingress into an ion block (50). The block (50) has an entrance orifice cone (70) in communication with an inlet channel (60), and an outlet channel (80) which has a first end that intersects the inlet channel (60) at 90° therto. The outer end of the outlet channel (80) opens into an evacuation chamber (90) which is pumped via a rotary vacuum pump (110). The reduced pressure within the channels of the ion block (50) draws sample droplets therethrough. An exit orifice defined by an exit orifice cone (130) is formed in the outlet channel (80) and sample ions pass through into a mass analyzer region (180). The right-angle bend between the inlet and outlet channels introduces turbulence and promotes desolution. Streaming of droplets from the entrance cone (70) to the exit cone (130) is also prevented.

8 Claims, 1 Drawing Sheet

ION SOURCE FOR MASS ANALYZER

CROSS-REFERENCE TO RELATED APPLICATIONS

This application is a national stage filing of International Application No. PCT/GB00/00301, which is based on GB 9903138.7.

BACKGROUND

The present invention relates to an ion source for a mass analyser, and particularly to an ion source which operates at atmospheric pressure.

Mass spectrometers normally operate at low pressure, for analysing materials such as organic substances. To permit mass analysis, ions of the material under investigation must be generated. It is particularly desirable for biological substances that the ion source operates at atmospheric pressure.

The first stage in this type of material analysis is typically to pass the material through a chromatograph. Depending upon the application, it is possible to use either gas chromatography (GC) or liquid chromatography (LC). The present invention is particularly concerned with LC.

The next stage in the analysis is to generate a source of ions from the LC eluent.

Several atmospheric pressure ion sources for doing this are known. The electro-spray ionization (ESI) source typically consists of a small tube or capillary through which a sample liquid consisting of the LC eluent is flowed. The sample liquid comprises the sample compounds and molecules to be analysed contained in a solvent. The capillary is maintained at a high potential difference relative to an adjacent surface. The liquid emerges from the tube and disperses into fine ionised droplets as a consequence of the high electric field at the tip of the capillary. The droplets are then desolvated by heating them to evaporate the solvent. Eventually, the ionised droplets become so small that they are unstable, whereupon they vaporize to form gaseous sample ions.

Another form of atmospheric pressure ion source is the atmospheric pressure chemical ionisation (APCI) ion source which uses a heated nebulizer to convert droplets of sample solution into the gaseous phase before ionisation. A corona discharge electrode is located adjacent to the nebulizer outlet. This ionises the surrounding gas and the nebulized solvent molecules. Since sample molecules generally have greater proton affinity than solvent molecules, collisions between them result in preferential ionisation of the sample molecules. In this way, gaseous sample ions are produced. ESI and APCI are complementary techniques, in that ESI is limited to charged or polar compounds, whereas APCI can be used for less polar compounds; in both cases an aerosol is generated in the atmospheric pressure region.

Common to all atmospheric pressure ionisation (API) sources for mass spectrometers is an ion inlet orifice that forms an interface between the API region and the low pressure region of the source or mass analyser. This orifice is generally of necessity small (typically less than 0.5 mm in diameter) to allow the vacuum system attached to the mass analyser to maintain a satisfactory vacuum (1 mpa or less) therein at a finite pumping speed.

In recent years, there has been a tendency for the API source of commercial LC mass spectrometers to be arranged orthogonally of the ion inlet orifice. This is because of the improved tolerance to involatile components in the LC eluent with this geometry.

One particular problem with known API sources is their relative inefficiency. Even a very good known LC mass spectrometer has an efficiency of only about $10^{-6}$, when considering the total ion signal theoretically available from the analyte in the liquid phase compared with the eventual ion signal received at the detector of the mass spectrometer. The reasons for this are believed to include incomplete ionisation of the analyte, incomplete desolvation (wherein some ions remain in the liquid phase within the aerosol generated by the API source) and transmission losses through the ion source and mass analyser.

U.S. Pat. No. 5,756,994 shows one particular implementation of an LC source. As seen in FIG. 1 of that patent, the LC source consists of an ion block having an entrance chamber and an evacuation port connected by a smaller diameter extraction chamber. Ions in the atmospheric pressure region pass into the entrance chamber through the entrance cone and are carried by a high velocity viscous jet from the entrance chamber through the extraction chamber and into the evacuation port. A second, exit cone is located within a conical recess in the ion block so that its apex lies flush with the core of the extraction chamber. The exit cone is electrically insulated from the ion block by means of an insulating ring. A voltage is applied between the exit cone and ion block and as a result a proportion of ions are extracted from the jet in the transfer lens.

This arrangement suffers from a number of drawbacks. Firstly, due to the rapid expansion of the incoming gas, the jet undergoes considerable cooling and in an attempt to combat this problem a considerable heat input must be applied to the ion block to promote desolvation and prevent the formation of solvent cluster ions. The heater in turn introduces considerable cost to the API source assembly as a result not only of the heater itself, but also the thermocouple, necessary electrical connections, associated power supplies and control electronics. In addition, to prevent excessive thermal losses from the ion block due to conduction, the ion block must be mounted on an insulating filled PTFE block such as PEEK which is also expensive and, moreover, is not totally compatible with API sources.

Another orthogonal API source has been proposed in GB-A-2,324,906. The device described therein requires no electrostatic field for ion extraction as the entrance cone, ion block and exit cone are held at the same potential. As seen in FIG. 1 of this document, the incoming expanding jet impinges directly onto a disrupter pin, which increases the turbulence of the flow. This also serves to increase the internal energy of the gas stream and in doing so promotes desolvation and prevents solvent cluster formation. Thus the disrupter pin performs the same function as the ion block heater employed in the device of U.S. Pat. No. 5,756,994, but without the associated hardware costs. Additionally, the internal geometry of the ion block in GB-A-2,324,906 is designed such that the apex of the exit cone resides within an eddy of the viscous gas flow path (see FIG. 1 thereof). Ions then have an increased probability of passing through the exit cone. Thus the arrangement of GB-A-2,423,906 provides a similar overall ion transmission efficiency to the arrangement described in U.S. Pat. No. 5,756,994. Furthermore, because the probe described in GB-A-2,324,906 may be orientated orthogonally to the optical axis of the instrument in an horizontal plane, a neater and more compact source design is possible.

However, the arrangement shown in GB-A-2,324,906 requires the source region to be operated with a relatively high pressure inside the ion volume, typically of order 1.5 kPa (15 mbar), for efficient operation. This is an important consideration as the increased source pressure results in an associated higher gas throughput into the intermediate and analyser vacuum regions. For a given pumping system this results in correspondingly higher pressures in the two regions. High analyser pressures may result in ion signal loss and higher background noise levels. Thus a pump with higher pumping speed and thus higher cost must be employed to gain the required vacuum.

It is an object of the present invention to address these and other problems associated with the prior art.

SUMMARY

According to the present invention, there is provided an ion source for a mass spectrometer which operates at a low pressure comprising:

- an atmospheric pressure sample ioniser operable at atmospheric pressure to provide a sample flow containing desired sample ions;
- an interface chamber having an entrance aperture, an exit aperture and an exhaust port, the entrance aperture being arranged to receive sample ions provided by the atmospheric pressure sample ioniser entrained in a gas flow, and the exit aperture being arranged for sample ions to exit the interface chamber to the mass spectrometer; and
- a vacuum pump in communication with the exhaust port of the interface chamber to hold the pressure thereof at a pressure intermediate the operating pressure of the mass spectrometer and atmospheric pressure; the interface chamber defining a flow passage for gas and entrained sample ions from the entrance aperture to the exhaust port, the exit aperture being located in the flow passage between the entrance aperture and the exhaust port, wherein the flow passage is shaped to cause substantially all the gas and entrained sample ions entering the entrance aperture to flow within a distance "d" of the exit aperture, where d is less than five times the diameter of the exit aperture, and to provide no line of sight between the entrance and exit apertures. In a particularly preferred embodiment, the distance "d" is less than three times the diameter of the exit aperture.

Thus, the source of the present invention has no line of sight between the entrance and exit apertures. This prevents the undesirable 'streaming' of ions from the entrance to the exit apertures. In contrast to the device of GB-A-2,423,906, however, the exit aperture is directly in the flow path between the entrance aperture and the exhaust port. Previously, the exit aperture was located adjacent to a region out of the direct flow path of the sample ions.

Preferably, the interface chamber has a bend therein to introduce turbulence into the gas and entrained sample ions as they flow along the said flow passage. There are several advantages to this arrangement. Firstly, the process of changing direction introduces internal energy into the viscous flow stream. Secondly, desolvation is promoted and solvent cluster formation is minimized. This in turn reduces the background signal which is typically generated by solvent cluster ions. Thus, the limit of detection is improved, which is a particularly desirable feature of commercial LC mass spectrometers.

Thirdly, the flow rate past the exit aperture is reduced. This increases the ion residence time in the vicinity of the exit cone and hence the probability of ion extraction through the exit aperture.

Thus, a higher ion transmission than previously is possible, without the need for direct ion block heating.

Most preferably, the interface chamber has a first passage adjacent the entrance aperture, and a second passage adjacent the exit aperture, the first and second communicating with each other and passages intersecting at an angle of approximately 90° to each other.

The right angle bend in the interface chamber provides a particularly efficient way of maximizing the internal energy introduced into the viscous flow stream, promoting desolvation, preventing solvent cluster formation and slowing down the gas flow rate through the chamber. With such an arrangement, a gain of up to 25 times more ion signal relative to known API sources has been observed. This not only improves the limit of detection but also the limit of quantitation. Other geometries which force a change in direction of the gas flow are also contemplated, however.

Advantageously, a part of the interface chamber between the entrance and exit apertures is of smaller sectional area than the remainder of the interface chamber such that the net flow of sample ions between the entrance and exit apertures is throttled. Most preferably, the first passage adjacent the entrance aperture is of smaller sectional area than that of the second passage adjacent the exit aperture.

This throttling allows the optimum pressure in the interface chamber to be obtained. Indeed, the pressure within the interface chamber when throttling is employed may be comparable or even lower than previous sources; thus reducing gas throughput into the mass analyser of the mass spectrometer.

A significant proportion of the manufacturing costs reside in the vacuum system. The vacuum pump is typically a turbo pump whose cost is roughly proportional to the pumping speed it is able to deliver. Thus, the lower pumping speed required in the preferred embodiment of the present invention permits a lower cost pump to be employed.

Preferably, both the first passage and the second passage have a length substantially longer than their respective widths.

Preferably, the exit aperture comprises a frusto-conical hole formed within a block defining the interface chamber, the exit aperture further comprising a correspondingly frusto-conical insert member, the insert member having a bore therethrough to permit passage of sample ions and being coaxially aligned with the frusto-conical hole in the block. In that case, the insert member may be electrically insulated from the block. This is because it is necessary to apply a potential difference between the insert member and the block to permit extraction of the ions into the mass spectrometer.

This invention may be put into practice in a number of ways, one of which will now be described by way of example only.

DETAILED DESCRIPTION

Figure 1:
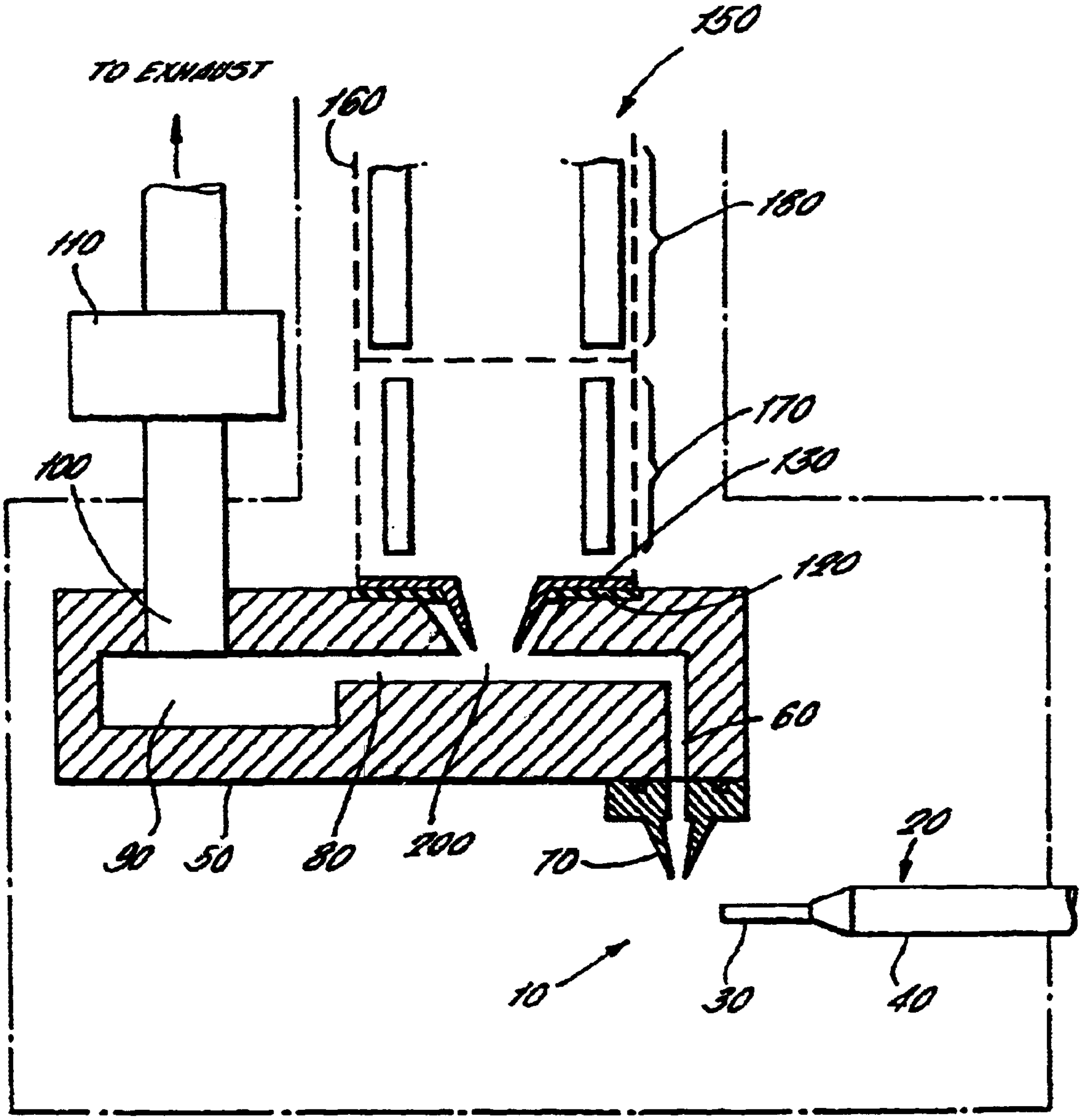
FIG. 1 depicts a schematic view of an atmospheric pressure ion source according to an embodiment of the present invention, together with a part of a mass spectrometer.

The ion source of FIG. 1 has an ionisation region 10 at atmospheric pressure. Ionised sample droplets are presented at the ionisation region 10 by a capillary tube 30 held at a high potential and a nebulizer heater 40 which desolvates the sample droplets. As will be understood by the skilled person, this arrangement is part of an electro-spray source 20, although other known arrangements for generating ionised sample droplets might be used instead.

An ion block 50 defines an ion source interface region. For ease of explanation, in the following description the interface region is described as a plurality of separate interconnected parts, but it will be appreciated that, in fact, the ion block 50 is preferably cast or otherwise formed as a single block.

An inlet channel 60 of the interface region is aligned with and in communication with an entrance orifice cone 70. It is preferable that the entrance orifice cone 70 is detachably mounted upon the ion block 50. This facilitates both manufacture of the atmospheric pressure ionisation (API) source, and the cleaning of the entrance orifice cone. Typically, the entrance aperture is between 0.25 and 0.4 mm in diameter. An entrance aperture diameter of 0.3 mm is particularly suitable in the described embodiment.

The interface region further includes an outlet channel 80. A first end of this outlet channel intersects the end of the inlet channel 60 distal from the entrance orifice cone 70 at an angle of approximately 90°.

The end of the outlet channel distal from the inlet channel 60 opens into an evacuation chamber 90. The evacuation chamber has an evacuation port 100 to which is connected a conventional vacuum pump 110. For example, a 28 $m^3$/hr rotary pump may be employed.

The vacuum pump 110 generates a partial vacuum within the ion source interface region. The actual vacuum generated will depend in particular upon the pumping rate of the vacuum pump 110. In this manner, ionised droplets generated in the ionisation region 10 are drawn into the interface region via the entrance orifice cone 70 and along the inlet and outlet channels 60, 80 into the evacuation chamber 90. From there, the ionised droplets are exhausted through the evacuation port 100.

A seen in FIG. 1, the ion block 50 has a frusto-conical opening therein. The lower end of the frusto-conical opening, which is of relatively smaller diameter, communicates with the outlet channel 80 approximately halfway along it between the inlet channel 60 and the evacuation chamber 90. The upper end of the frusto-conical opening in the ion block, which is of relatively large diameter, opens into a seat on the upper surface of the ion block 50.

An electrically insulating washer 120 is located upon the seat in the ion block 50. An exit orifice cone 130 is mounted on top of the electrically insulating washer and has a tapered sleeve which sits inside the frusto-conical opening in the ion block but is spaced therefrom. The electrically insulating washer 120 therefore serves to isolate the exit orifice cone 130 from the ion block 50.

The exit orifice cone 130 serves to communicate between the outlet channel 80 of the ion source interface region and a spectrometer region shown in FIG. 1 generally at 150. The spectrometer region 150 typically includes a conventional quadruple or magnetic sector mass spectrometer mounted within a housing shown in dotted line at 160.

The exit orifice cone 130 opens into an RF lens region 170 within the spectrometer housing 160, which is typically evacuated to around 0.6 Pa. The RF lens region 170 in turn communicates with a mass analyser region 180 which is typically evacuated to 8 mPa.

It will be appreciated that the spectrometer region 150 does not form a part of the present invention and that the elements described therein are accordingly highly schematic. The skilled person will understand that other conventional elements, such as an ion detector and so forth, will also be present in the spectrometer region 150, although these are not shown for clarity.

A proportion of the ionised droplets entering the entrance orifice cone 70 and passing through the ion source interface region to exhaust will thus be drawn from an extraction region 200 in the outlet channel 80 adjacent the exit orifice cone 130 and into the spectrometer region 150. In the described embodiment, a 1 mm diameter aperture in the exit orifice cone 130 is preferred. Although smaller apertures could be used to reduce the pumping rate of the pump which evacuates the mass spectrometer, this also reduces the amount of ions passing through the exit orifice into the mass spectrometer.

The intersection of the inlet and outlet channels at a 90° angle introduces a right-angled bend into the path (defined by the ion source interface region in the ion block 50) from the entrance orifice cone 70 to the extraction region 200. This introduces internal energy into the viscous flow stream of the ionised droplets. The right-angled bend provides a very efficient means of promoting desolvation and preventing solvent cluster formation. Furthermore, the right-angled bend in the ion source interface region slows down the gas flow rate through the extraction chamber. This in turn increases the ion residence time in the extraction region 200 and increases the probability of ion extraction through the exit orifice cone 130. As seen in FIG. 1, the optical axis of the exit orifice cone 130 is generally parallel to that of the entrance orifice cone 70. However, previous API sources have had a direct line of sight between the entrance aperture to the ion block and the exit aperture thereof which allowed ionised droplets to "stream" the entrance to the exit.

Reffering to FIG. 1 once more, it will be seen that the inlet channel 60 has a smaller sectional area than that of the outlet channel. For example, the inlet channel 60 may have a diameter of approximately 2 mm, the outlet channel having a larger diameter of about 3 mm. This throttling of the ionised droplets as they pass from the entrance orifice cone 70 to the exit orifice cone 130 or to exhaust allows optimum pressure in the extraction region 200 to be achieved.

The combined effect of these features is a higher ion transmission than previously observed. In particular, gains of up to 25 times more ion signal have been observed when compared to previous orthogonal API sources. Furthermore, no direct ion block heating is necessary. The higher ion transmission in turn provides an improved limit of detection and limit of quantitation for the LC mass spectrometer.

The arrangement described above is further advantageous in that the probe may be oriented orthogonally to the optical axis of the instrument in a horizontal plane. This allows for a neater and more compact design.

The source described above may readily be employed with the aQa cleaning system described in PCT/GB98/02359. In this case, the source robustness is improved.

What is claimed is:

1. An ion source for a mass spectrum which operates at a low pressure comprising:

an atmospheric pressure sample ioniser operable at atmospheric pressure to provide a sample flow containing desired sample ions;

an interface chamber having an entrance aperture, and exit aperture and exhaust port, the entrance aperture being arranged to receive sample ioniser entrained in a gas flow, and the exit aperture being arranged for sample ions to exit the interface chamber to the mass spectrometer, and a vacuum pump in communication with the exhaust port of the interface chamber to hold the pressure thereof at a pressure intermediate the operating pressure of the mass spectrometer and atmospheric pressure; the interface chamber defining a flow passage for gas and entrained sample ions from the entrance aperture to the exhaust port, the exit aperture being located in the flow passage between the entrance aperture and the exhaust port, wherein the flow passage is shaped to redirect substantially all the gas and entrained sample ions entering the entrance aperture before they reach the exit aperture and to cause said redirected ions to flow within a distance "d" of the exit aperture, where d is less than five times the diameter of the exit aperture, and to provide no line of sight between the entrance and exit apertures.

2. An ion source as claimed in claim 1, in which the interface chamber has a bend therein to introduce turbulence into the flow of gas and entrained sample ions as they flow along the said flow passage, the bend being formed between the said entrance aperture and the said exit aperture.

3. An ion source as claimed in claim 1, in which the interface chamber has a first passage adjacent the entrance aperture, and a second passage adjacent the exit aperture, the first and second passages communicating with each other and intersecting at an angle of approximately 90° to each other such that the intersection lies between the said entrance and exit apertures.

4. An ion source as claimed in claim 1, in which a part of the interface chamber between the entrance and exit apertures is of smaller sectional area than the remainder of the interface chamber such that the net flow of sample ions between the entrance and exit apertures is throttled.

5. An ion source as claimed in claim 3, in which the first passage adjacent the entrance aperture is of smaller sectional are a than that of the second passage adjacent the exit aperture such that the net flow of sample ions between the entrance and exit apertures is throttled.

6. An ion source as claimed in claim 3, in which both the first passage and the second passage have a length substantially longer than their respective widths.

7. An ion source as claimed in claim 1, in which the exit aperture comprises a frusto-conical hole formed within a block defining the interface chamber, the exit aperture further comprising a correspondingly frusto-conical insert member, the insert member having a bore therethrough to permit passage of sample ions and being coaxially aligned with the frusto-conical hole in the block.

8. A ion source as claimed in claim 7, in which the insert member is electrically insulated from the block.

* * * * *

UNITED STATES PATENT AND TRADEMARK OFFICE

CERTIFICATE OF CORRECTION

PATENT NO. : 6,700,119 B1
APPLICATION NO. : 09/913338
DATED : March 2, 2004
INVENTOR(S) : Giles It is certified that error appears in the above-identified patent and that said Letters Patent is hereby corrected as shown below:

In the abstract, line 7, the word “outer” should be replaced with -- other --.

In the abstract, line 15, the word “desolution” should be replaced with -- desolvation --.

Column 5, line 35, please replace the words “A seen” with -- As seen --.

Column 5, line 54, please replace with word “quadruple” with -- quadrupole --.

Column 6, line 29, after the words “to “stream””, please insert -- from --.

Column 6, line 30, please replace the word “Reffering” with -- Referring --.

Column 6, line 54, Claim 1, please replace the word “spectrum” with -- spectrometer --.

Column 8, line 8, Claim 5, please replace the words “are a” with -- area --.

Signed and Sealed this

Fifth Day of December, 2006

JON W. DUDAS
*Director of the United States Patent and Trademark Office*